United States Patent
Ochiai et al.

(10) Patent No.: US 8,786,906 B2
(45) Date of Patent: Jul. 22, 2014

(54) IMAGE PROCESSING APPARATUS AND IMAGE PROCESSING METHOD

(75) Inventors: Takashi Ochiai, Machida (JP); Koji Fuse, Tokyo (JP)

(73) Assignee: Canon Kabushiki Kaisha, Tokyo (JP)

(\*) Notice: Subject to any disclaimer, the term of this patent is extended or adjusted under 35 U.S.C. 154(b) by 252 days.

(21) Appl. No.: 13/289,672

(22) Filed: Nov. 4, 2011

(65) Prior Publication Data

US 2012/0127535 A1    May 24, 2012

(30) Foreign Application Priority Data

Nov. 19, 2010   (JP) ................................. 2010-258605

(51) Int. Cl.
    *H04N 1/405* (2006.01)
(52) U.S. Cl.
    USPC ........................................................ 358/3.06
(58) Field of Classification Search
    USPC ...................................... 358/3.06, 3.26, 3.14
    See application file for complete search history.

(56) References Cited

U.S. PATENT DOCUMENTS

| 4,663,850 | A | * | 5/1987 | Kaneko et al. | ................ | 33/1 BB |
| 2002/0186417 | A1 | * | 12/2002 | Inoue | ........................... | 358/3.14 |
| 2007/0024914 | A1 | * | 2/2007 | Chung et al. | ................. | 358/3.26 |

FOREIGN PATENT DOCUMENTS

| JP | 8-051536 A | 2/1996 |
| JP | 2007-129558 A | 5/2007 |

\* cited by examiner

*Primary Examiner* — Mark Zimmerman
*Assistant Examiner* — Michael Burleson
(74) *Attorney, Agent, or Firm* — Canon USA, Inc., IP Division

(57) ABSTRACT

An image processing apparatus for performing screen processing on input image data via passes may include a screen processing unit, a detection unit, and a correction unit. The screen processing unit receives image data as received image data and performs screen processing on the received image data to produce screen-processed image data. The detection unit detects a difference of low frequency components between the received image data and the screen-processed image data. The correction unit corrects the screen-processed image data based on a difference detected by the detection unit. On subsequent passes, a process of at least one of the screen processing unit, the detection unit, and the correction unit is repeated to convert the input image data to screen-processed image.

16 Claims, 8 Drawing Sheets

| | | | | | | | |
|---|---|---|---|---|---|---|---|
| 0 | 0 | 0 | 0 | 0 | 255 | 255 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 255 | 255 | 255 | 0 | 0 |
| 0 | 0 | 0 | 255 | 255 | 255 | 0 | 0 |
| 0 | 0 | 0 | 0 | 255 | 0 | 0 | 0 |

303 — Out_c

| | | | | | | | |
|---|---|---|---|---|---|---|---|
| 214 | 228 | 208 | 154 | 124 | 148 | 213 | 247 |
| 214 | 254 | 234 | 180 | 122 | 116 | 179 | 213 |
| 240 | 246 | 226 | 172 | 70 | 51 | 65 | 148 |
| 232 | 204 | 184 | 83 | 29 | 9 | 24 | 72 |
| 190 | 140 | 133 | 75 | 22 | 2 | 16 | 65 |
| 78 | 110 | 134 | 102 | 48 | 29 | 43 | 91 |
| 44 | 149 | 187 | 192 | 163 | 90 | 103 | 164 |
| 45 | 195 | 234 | 240 | 211 | 149 | 128 | 153 |
| 79 | | | | | | | |

302 — Th_c

| | | | | | | | |
|---|---|---|---|---|---|---|---|
| 50 | 75 | 50 | 25 | 0 | 25 | 50 | 75 |
| 50 | 75 | 50 | 25 | 0 | 25 | 50 | 75 |
| 50 | 75 | 50 | 25 | 0 | 25 | 50 | 75 |
| 50 | 75 | 50 | 25 | 0 | 25 | 50 | 75 |
| 50 | 75 | 50 | 25 | 0 | 25 | 50 | 75 |
| 50 | 75 | 50 | 25 | 0 | 25 | 50 | 75 |
| 50 | 75 | 50 | 25 | 0 | 25 | 50 | 75 |
| 50 | 75 | 50 | 25 | 0 | 25 | 50 | 75 |

DUTY DATA AFTER
COLOR SEPARATION
D_k

DUTY DATA AFTER SCREEN
PROCESSING (FIRST)
Out1_k

LOW FREQUENCY
COMPONENTS OF DUTY
DATA AFTER COLOR
SEPARATION (FIRST)
D_f_k

LOW FREQUENCY
COMPONENTS OF DUTY
DATA AFTER SCREEN
PROCESSING (FIRST)
Out1_f_k

DUTY DATA AFTER REMOVAL
OF DOCUMENT MOIRE
COMPONENT (FIRST)
D1_k

DUTY DATA AFTER SCREEN
PROCESSING (SECOND)
Out2_k

FIG.4B

DUTY DATA AFTER
COLOR SEPARATION
D_k

DUTY DATA AFTER SCREEN
PROCESSING (10TH)
Out10_k

LOW FREQUENCY
COMPONENTS OF
DUTY DATA AFTER
COLOR SEPARATION
D_f_k

LOW FREQUENCY
COMPONENTS OF DUTY
DATA AFTER SCREEN
PROCESSING (10TH)
Out10_f_k

DUTY DATA AFTER REMOVAL
OF DOCUMENT MOIRE
COMPONENT (10TH)
D10_k

DATA AFTER REMOVAL OF
DOCUMENT MOIRE COMPONENT
AND SCREEN PROCESSING
Out_k

IMAGE PROCESSING APPARATUS AND IMAGE PROCESSING METHOD

BACKGROUND OF THE INVENTION

1. Field of the Invention

The present invention relates to screen processing.

2. Description of the Related Art

Conventionally, an area gradation method for realizing a gradation reproduction has been used to form an image on a recording media. The area gradation refers to a method for representing gradation by changing the ratio of an area to which a color material adheres. An amplitude modulation (AM) screen and a frequency modulation (FM) screen are representative ones. The AM screen represents a gradation image by modulating the size of an area (the size of a so-called halftone dot) to which a color material adheres and is characterized by the shape of a halftone dot, the direction at which a halftone dot is arranged (a halftone dot angle), and the arrangement density of a periodic halftone dot (the number of lines). On the other hand, the FM screen represents a gradation image by the density of dots by arranging minute isolated dots of a fixed size in a pseudo random manner. The minute dots need to be stably recorded when using the FM screen. In general, an image forming apparatus which is unstable in the reproduction of minute dots uses the AM screen.

In a case where the AM screen is used, so-called moire can occur in an output image. The moire refers to a visible periodic pattern which is generated when an input image interferes with periodically arranged halftone dots and high frequency components in the input image are folded back to a low frequency area. The following two methods are proposed as a method for suppressing such moire.

In a first method, an input image is subjected to filter processing to remove frequency components which may cause moire, from the input image (refer to Japanese Patent Application Laid-Open No. 08-051536). In a second method, if the moire occurs in using the AM screen, the FM screen in which minute isolated dots are arranged in a pseudo random manner is used instead of using the AM screen (refer to Japanese Patent Application Laid-Open No. 2007-129558). However, the techniques discussed in the above documents may cause the following problems.

In the method discussed in Japanese Patent Application Laid-Open No. 08-051536, the input image is subjected to filter processing using a low-pass filter to remove frequency components which causes moire, from the input image. The frequency components causing moire are high frequency components in the vicinity of a screen frequency. If a low pass filter sufficient to remove the frequency components causing moire is applied to the input image, a generally blurred image is produced.

In the method using the FM screen discussed in Japanese Patent Application Laid-Open No. 2007-129558, an image forming apparatus unstable in the reproduction of dots such as a printing device typified by offset printing or an electrophotographic recording apparatus has a problem that an output image is conspicuously rough.

SUMMARY OF THE INVENTION

The present invention is directed to obtain a high quality output image with the moire suppressed.

According to an aspect of the present invention, an image processing apparatus for performing screen processing on input image data via passes includes: a screen processing unit configured to receive image data as received image data and perform screen processing on the received image data to produce screen-processed image data, a detection unit configured to detect a difference of low frequency components between the received image data and the screen-processed image data, and a correction unit configured to correct the screen-processed image data based on a difference detected by the detection unit, wherein, on subsequent passes, a process of at least one of the screen processing unit, the detection unit, and the correction unit is repeated to convert the input image data to screen-processed image. According to the above feature, a high quality output image with moire suppressed can be acquired.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The present invention is directed to screen processing for converting image data to data representing gradation by the AM screen.

A first exemplary embodiment is described below.

Figures 1, 1A:
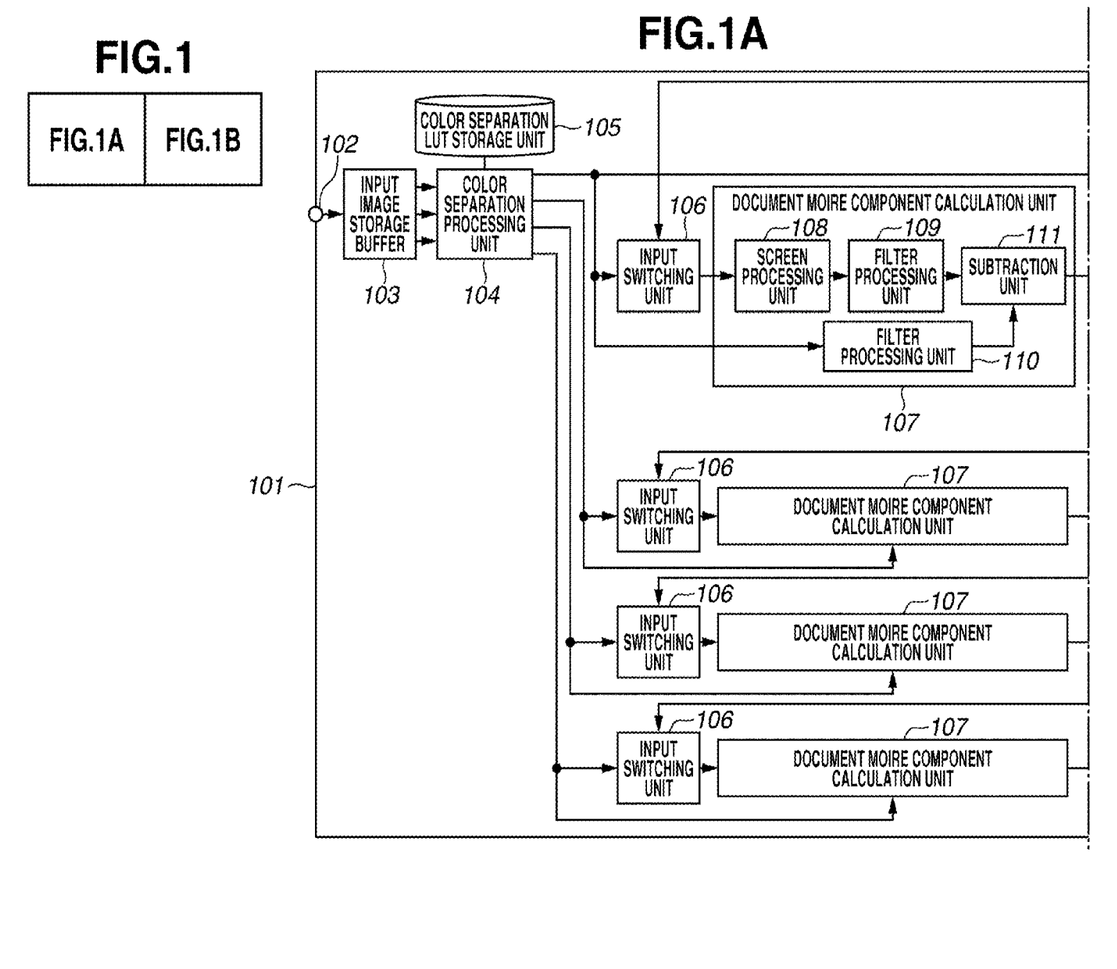
FIG. 1 includes FIG. 1A and FIG. 1B and is a block diagram illustrating a configuration of an image processing apparatus and an image forming apparatus.
Figure 1B:
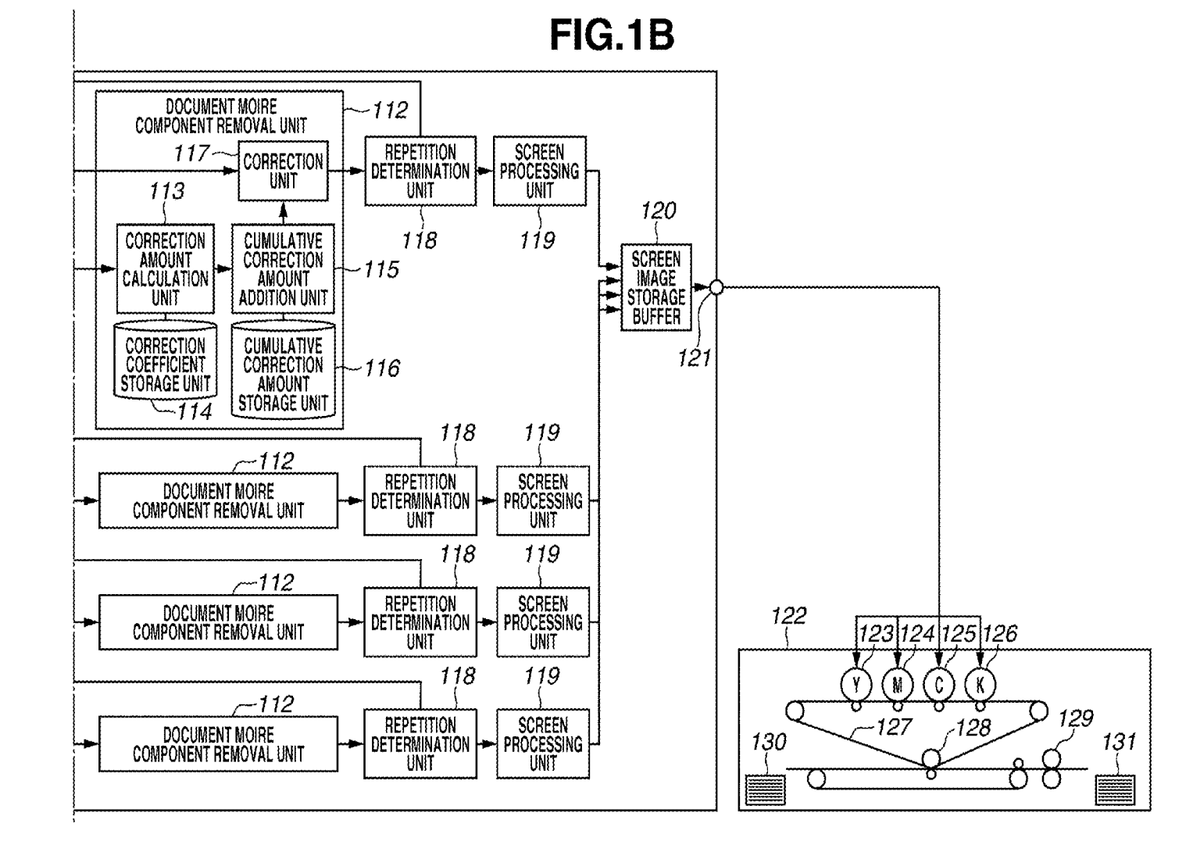

FIG. 1 is a block diagram illustrating a configuration of an image processing apparatus 101 and an image forming apparatus 122 which are applicable to the first exemplary embodiment. The image processing apparatus 101 is a general personal computer in which a driver adapted to an image forming apparatus, for example, is installed. Each configuration of the image processing apparatus 101 is realized by the computer executing a predetermined program. As an example of another configuration, the image forming apparatus 122, for example, may include the image processing apparatus 101.

The image processing apparatus 101 is connected with the image forming apparatus 122 via an interface or a circuit.

Image data to be printed are input to an image data input terminal 102 of the image processing apparatus 101 and stored in an input image storage buffer 103.

A color separation processing unit 104 performs the color separation of the image data stored in the input image storage buffer 103 into color component data corresponding to colors of color materials with which the image forming apparatus 122 is provided. A color separation processing references a look-up table for color separation stored in a color separation look-up table (LUT) storage unit 105.

An input switching unit 106 outputs either color component data output from the color separation processing unit 104 or the output data of a moire component removal unit 112 obtained via a repetition determination unit 118, to a moire component calculation unit 107.

The moire component calculation unit 107 calculates moire components based on the values of color materials separated by the color separation processing unit 104 and the output value from the input switching unit 106.

The moire component removal unit 112 removes the moire components calculated by the moire component calculation unit 107 from the values of color materials separated by the color separation processing unit 104.

The repetition determination unit 118 determines whether the calculation and the removal of the moire components are to be repeated according to the number of repetitions of the moire component calculation unit 107 and the moire component removal unit 112. If the number of repetitions reaches the predetermined number of repetitions, the repetition determination unit 118 is connected to the screen processing unit 119. If the present number of repetitions does not reach the predetermined number of repetitions, the repetition determination unit 118 is connected to the input switching unit 106.

The screen processing unit 119 performs the screen processing on the values of color materials output from the moire component removal unit 112 and stores the values in a screen image storage buffer 120 as screen-processed data. The screen processing refers to AM screen processing. The screen-processed data stored in the screen image storage buffer 120 are output to the image forming apparatus 122 from an output terminal 121. The moire component refers to moire occurring between a document (an input image) and a screen. The moire is caused when an input image interferes with a periodic AM screen and high frequency components in the input image are folded back to a low frequency area.

In the image forming apparatus 122, a latent image is formed on photosensitive drums 123, 124, 125, and 126 with colors C, M, Y, and K according to screen-processed data output from the image processing apparatus 101. Toner images are formed from the formed latent images on the photosensitive drums 123, 124, 125, and 126. The formed toner images are transferred to an intermediate transfer belt 127 to form full color images on the intermediate transfer belt 127. In a transfer unit 128, the images are transferred to paper supplied from a paper feed tray 130 and fixed in a fixing unit 129. The paper to which color images are fixed is sent to a discharge tray 131.

Figure 2:
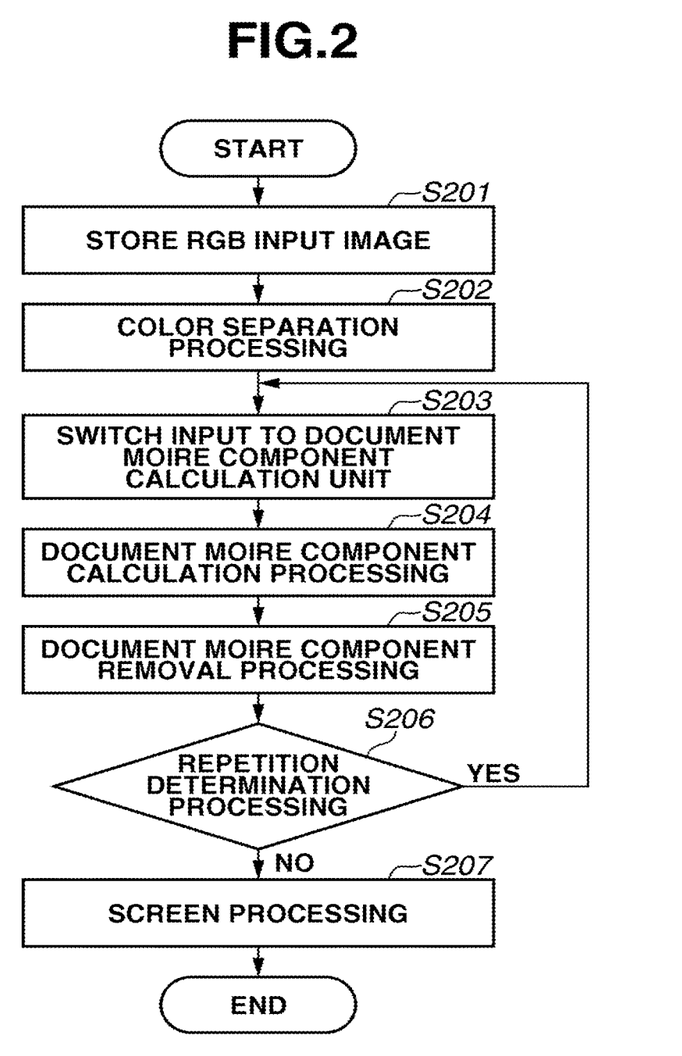
FIG. 2 is a flow chart illustrating an image processing method by the image processing apparatus.

An image processing method of the image processing apparatus 101 applicable to the present exemplary embodiment is described below using a flow chart in FIG. 2. Each step is performed on all pixels.

In step S201, image data with multiple gradations are input to the input terminal 102 of the image processing apparatus 101 and stored in the input image storage buffer 103. The input image data have three color components of red (R), green (G), and blue (B).

In step S202, the color separation processing unit 104 converts the image data with multiple gradations stored in the input image storage buffer 103 from RGB to CMYK using a color separation LUT stored in the color separation LUT storage unit 105. In the present exemplary embodiment, each color component data of CMYK is handled as 8 bits, however, the image data may be converted to the number of gradations equal to or higher than that.

The image forming apparatus of the present exemplary embodiment has four color materials of C, M, Y, and K. For this reason, the image data of RGB are converted to those of CMYK. More specifically, D_c, D_m, D_y, and D_k (0 to 255) corresponding to four types of color materials are formed according to equations (1) to (4):

$$D\_c = C\_LUT\_3D(R,G,B) \quad (1)$$

$$D\_m = M\_LUT\_3D(R,G,B) \quad (2)$$

$$D\_y = Y\_LUT\_3D(R,G,B) \quad (3)$$

$$D\_k = K\_LUT\_3D(R,G,B) \quad (4)$$

where, the functions defined on the right side of the equations (1) to (4) correspond to the contents of the LUT for color separation. The LUT defines output values to the color materials from three input values of red, green, and blue. In the present exemplary embodiment, since four colors of CMYK are provided, the LUT is configured such that four output values are acquired from three input values. The color separation processing in the present exemplary embodiment is completed by the above processing.

In step S203, the input switching unit 106 performs switching to either the output data of the color separation processing unit 104 or the output data of the moire component removal unit 112 provided via the repetition determination unit 118, and outputs the data to the moire component calculation unit 107.

In step S204, the moire component calculation unit 107 calculates moire components. The processing of the moire component calculation unit 107 is described in detail below with reference to FIG. 1.

The moire component calculation unit 107 includes a screen processing unit 108, filter processing units 109 and 110, and a subtraction unit 111. In FIG. 1, for the sake of simplicity of description, the block diagram for processing cyan is illustrated in detail and the detailed configuration for processing the image data of MYK is omitted.

The screen processing unit 108 performs the AM screen processing (hereinafter referred to as screen processing) on the color-separated duty data D_c, D_m, D_y, and D_k which are formed by the color separation processing unit 104 and outputs screen-processed data Out_c, Out_m, Out_y, and Out_k. The screen-processed data may include the moire which occurs when the color-separated duty data interferes with the AM screen.

The processing is described in detail below. The screen processing unit 108 stores threshold tables Th_c, Th_m, Th_y, and Th_k of the colors CMYK. The screen processing unit 108 performs the screen processing with reference to the threshold table corresponding to the color to be subjected to the screen processing. More specifically, the threshold tables and the corresponding color-separated duty data of the color to be subjected to the processing are compared for each pixel and screen-processed data is output. The outline of the screen processing is described below with cyan taken as an example for the sake of simplicity of description.

Figure 3:
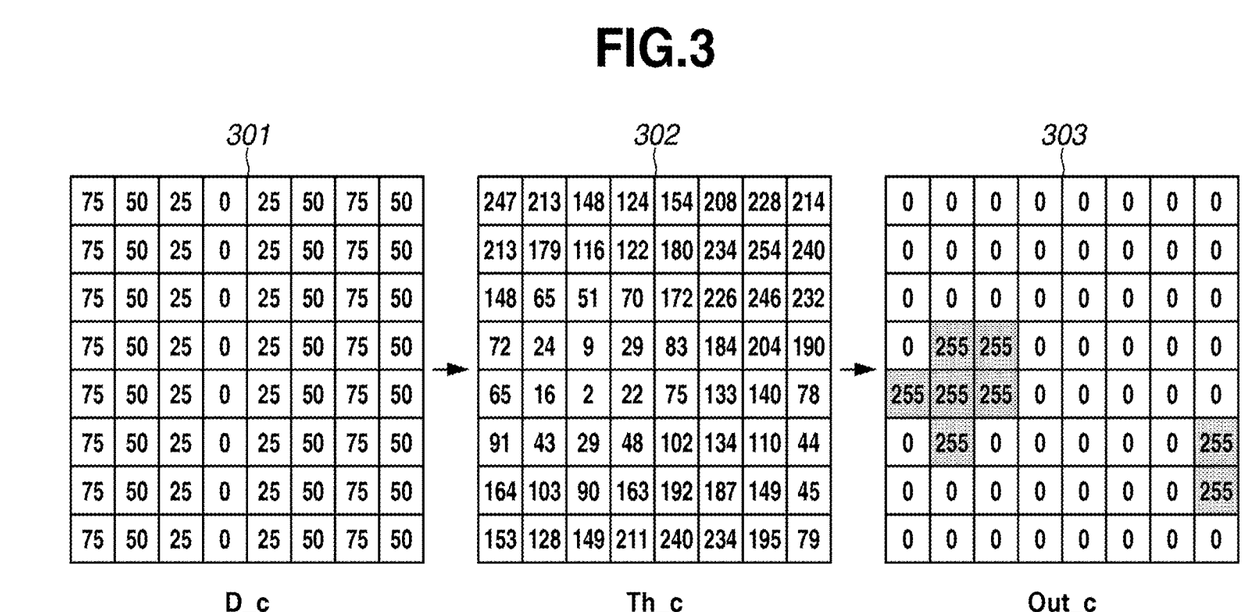
FIG. 3 illustrates a state where duty data which has undergone cyan separation are subjected to the screen processing.

FIG. 3 illustrates the screen processing which is performed on duty data subjected to cyan separation D_c 301. The threshold table Th_c 302 stores thresholds corresponding to pixel position. The screen processing unit 108 performs the screen processing represented by equations (5) and (6) on the duty data subjected to cyan separation D_c 301 of each pixel using the thresholds (0 to 255) corresponding to pixel positions. The cyan data Out_c 303 can be acquired. The threshold table Th_c 302 is a threshold group corresponding to address on a print image as illustrated in FIG. 3.

$$\text{When } D\_c \leq Th\_c, \text{Out}\_c = 0 \qquad (5)$$

$$\text{When } Th\_c < D\_c, \text{Out}\_c = 255 \qquad (6)$$

In the above example, cyan is taken as an example. Similarly, the screen processing unit 108 also subjects magenta, yellow, and black to the screen processing. Thereby, cyan data Out_c, magenta data Out_m, yellow data Out_y, and black data Out_k are acquired as screen-processed data.

Next, the filter processing unit 109 subjects the screen-processed data Out_c, Out_m, Out_y, and Out_k including the moire to the filter processing by a low-pass filter (hereinafter referred to as LPF) as represented by equations (7) to (10). Thereby, data of low-frequency components subjected to the screen processing Out_f_c, Out_f_m, Out_f_y, and Out_f_k is calculated:

$$\text{Out}\_f\_c = \text{Out}\_c * \text{LPF} \qquad (7)$$

$$\text{Out}\_f\_m = \text{Out}\_m * \text{LPF} \qquad (8)$$

$$\text{Out}\_f\_y = \text{Out}\_y * \text{LPF} \qquad (9)$$

$$\text{Out}\_f\_k = \text{Out}\_k * \text{LPF} \qquad (10)$$

where, an asterisk (*) indicates convolution.

The low-pass filter used in the filter processing unit 109 has a cutoff frequency according to the frequency characteristic of the screen used for the screen processing. The moire caused when the input image interferes with the screen occurs in a frequency band lower than about the screen frequency. The LPF has such a characteristic which cuts off a frequency band higher than the screen frequency.

Similarly, the filter processing unit 110 performs the filter processing on the color-separated duty data D_c, D_m, D_y, and D_k by a predetermined LPF as represented by equations (11) to (14). Thereby, low-frequency components of the duty subjected to the color separation D_f_c, D_f_m, D_f_y, and D_f_k are calculated:

$$D\_f\_c = D\_c * \text{LPF} \qquad (11)$$

$$D\_f\_m = D\_m * \text{LPF} \qquad (12)$$

$$D\_f\_y = D\_y * \text{LPF} \qquad (13)$$

$$D\_f\_k = D\_k * \text{LPF} \qquad (14)$$

where, an asterisk (*) indicates convolution.

The LPF used in the filter processing unit 110 needs to have approximately the same cutoff frequency as the filter used in the filter processing unit 109. In the present exemplary embodiment, the same LPF is used. However, effect can be achieved even if the LPF is not the same one.

Next, the subtraction unit 111 subtracts low-frequency components of the duty subjected to the color separation D_f_c, D_f_m, D_f_y, and D_f_k from low-frequency components of the data subjected to the screen processing Out_f_c, Out_f_m, Out_f_y, and Out_f_k as represented by equations (15) to (18). The thus-acquired values P_c, P_m, P_y, and P_k are low-frequency components of a difference between the duty data before the screen processing and the data after screen-processing. The moire is caused when an input image interferes with a screen and high frequency components of the input image data are folded back to a low frequency area by the screen processing. Therefore, the low-frequency components D_c, P_m, P_y, and P_k of errors caused by the screen processing correspond to the moire components.

$$P\_c = (\text{Out}\_f\_c - D\_f\_c) \qquad (15)$$

$$P\_m = (\text{Out}\_f\_m - D\_f\_m) \qquad (16)$$

$$P\_y = (\text{Out}\_f\_y - D\_f\_y) \qquad (17)$$

$$P\_k = (\text{Out}\_f\_k - D\_f\_k) \qquad (18)$$

The moire component calculation processing in the present exemplary embodiment is completed by the above processing.

In step S205, the moire component removal unit 112 removes moire components. The moire component removal unit 112 includes a correction amount calculation unit 113, a correction coefficient storage unit 114, a cumulative correction amount addition unit 115, a cumulative correction amount storage unit 116, and a correction unit 117. For the sake of simplicity, the configuration components except blocks for processing cyan are omitted from FIG. 1.

The correction amount calculation unit 113 multiplies the moire components P_c, P_m, P_y, and P_k by the correction coefficients h_c, h_m, h_y, and h_k to calculate an appropriate correction amount as represented by equations (19) to (22). Thereby, the correction amounts P_New_c, P_New_m, P_New_y, and P_New_k are generated.

$$P\_\text{New}\_c = h\_c \times P\_c \qquad (19)$$

$$P\_\text{New}\_m = h\_m \times P\_m \qquad (20)$$

$$P\_\text{New}\_y = h\_y \times P\_y \qquad (21)$$

$$P\_\text{New}\_k = h\_k \times P\_k \qquad (22)$$

The correction coefficients h_c, h_m, h_y, and h_k by which the moire components P_c, P_m, P_y, and P_k are multiplied are stored in the correction coefficient storage unit 114. In the present exemplary embodiment, all values of the correction coefficients h_c, h_m, h_y, and h_k are taken as 1, however, values other than 1 may be used. For example, a monochromatic circular zone plate chart is printed by distributing the values of correction coefficients to each color plate of CMYK and the correction coefficients corresponding to the chart in which moire is suppressed to the maximum may be set. The correction coefficients h_c, h_m, h_y, and h_k may be decreased by the number of repetitions of the moire component calculation unit 107 and the moire component removal unit 112, as represented by the equations (23) to (26). When the correction coefficients are set so that the correction amount is converged according to the number of repetitions, the correction is stabilized as its effect.

$$h\_c = (1 - n/N) \qquad (23)$$

$$h\_m = (1 - n/N) \qquad (24)$$

$$h\_y = (1 - n/N) \qquad (25)$$

$$h\_k = (1 - n/N) \qquad (26)$$

where, n represents the present number of repetitions and N indicates the previously set number of repetitions.

The cumulative correction amount addition unit 115 adds correction amounts P_New_c, P_New_m, P_New_y, and P_New_k to cumulative correction amounts P_Sum_Old_c, P_Sum_Old_m, P_Sum_Old_y, and P_Sum_Old_k stored in the cumulative correction amount storage unit 116.

New cumulative correction amounts P_Sum_New_c, P_Sum_New_m, P_Sum_New_y, and P_Sum_New_k acquired by the addition are represented by the following equations:

$$P\_Sum\_New\_c = P\_Sum\_Old\_c + P\_New\_c \quad (27)$$

$$P\_Sum\_New\_m = P\_Sum\_Old\_m + P\_New\_m \quad (28)$$

$$P\_Sum\_New\_y = P\_Sum\_Old\_y + P\_New\_y \quad (29)$$

$$P\_Sum\_New\_k = P\_Sum\_Old\_k + P\_New\_k \quad (30)$$

The addition values acquired by the equations (27) to (30) are stored in the cumulative correction amount storage unit 116 as new cumulative correction amounts.

The correction unit 117 subtracts the new cumulative correction amounts P_Sum_New_c, P_Sum_New_m, P_Sum_New_y, and P_Sum_New_k from the color-separated duty data D_c, D_m, D_y, and D_k as represented by equations (31) to (34). Thereby, the duty data after the removal of moire components D_New_c, D_New_m, D_New_y, and D_New_k are calculated.

$$D\_New\_c = (D\_c - P\_Sum\_New\_c) \quad (31)$$

$$D\_New\_m = (D\_m - P\_Sum\_New\_m) \quad (32)$$

$$D\_New\_y = (D\_y - P\_Sum\_New\_y) \quad (33)$$

$$D\_New\_k = (D\_k - P\_Sum\_New\_k) \quad (34)$$

The moire component removal processing is completed by the above processing. The processing in the moire component calculation unit 107 and the moire component removal unit 112 is repeated by the predetermined number of times.

All pixels are subjected to the processing in steps S203 and S204 and the processing proceeds to step S206. In step S206, the repetition determination unit 118 determines whether the processing in the moire component calculation unit 107 and the moire component removal unit 112 is repeated again. Supposing that the number of repetitions is set to 10, if the number of repetitions at present reaches 10 (YES in step S206), the image data after the removal of moire components acquired by the moire component removal unit 112 is output to the screen processing unit 119. If the number of repetitions at present does not reach 10 (NO in step S206), the moire component removal unit 112 outputs the image data after the removal of moire components, to the input switching unit 106. The input switching unit 106 switches the processing so that the image data after removal can pass through and provides the image data as an input for the screen processing unit 108 in the moire component calculation unit 107. The processing is repeated until the number of repetitions reaches 10.

If the number of repetitions reaches 10, the processing proceeds to step S207. The screen processing unit 119 performs the AM screen processing on the duty data after the removal of moire components D_New_c, D_New_m, D_New_y, and D_New_k. Thereby, the screen-processed data after the removal of moire components Out_c, Out_m, Out_y, and Out_k are generated. The screen processing unit 119 stores those data in the cumulative correction amount storage unit 116.

The color threshold table used at this point needs to be the same as the one used in the screen processing unit 108. The screen-processed data after the removal of moire components stored in the screen image storage buffer 120 is output from the output terminal 121 to the image forming apparatus 122.

The number of repetitions of the moire component calculation unit 107 and the moire component removal unit 112 can be arbitrarily set. Since detection and removal of moire components are repeated, the cumulative correction amount is optimized to remove the moire more accurately. The greater the number of repetitions, the higher the reduction effect of the moire. The appropriate number of repetitions can be set according to the needs of the user.

The effect of the image processing method in the present exemplary embodiment is described below with reference to FIG. 4.

Figure 4A:
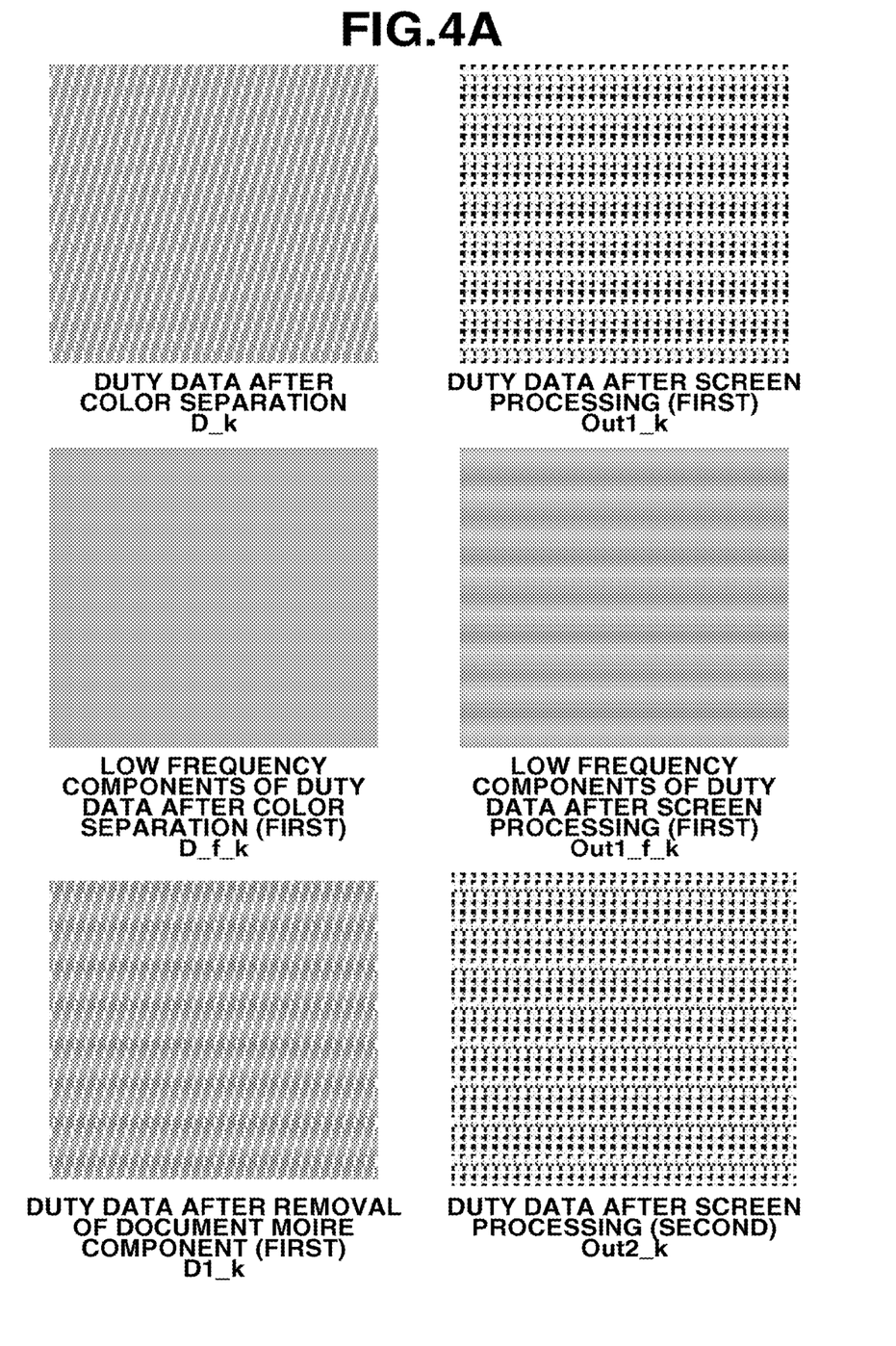
FIG. 4A illustrates each data in the image processing method.
Figure 4B:
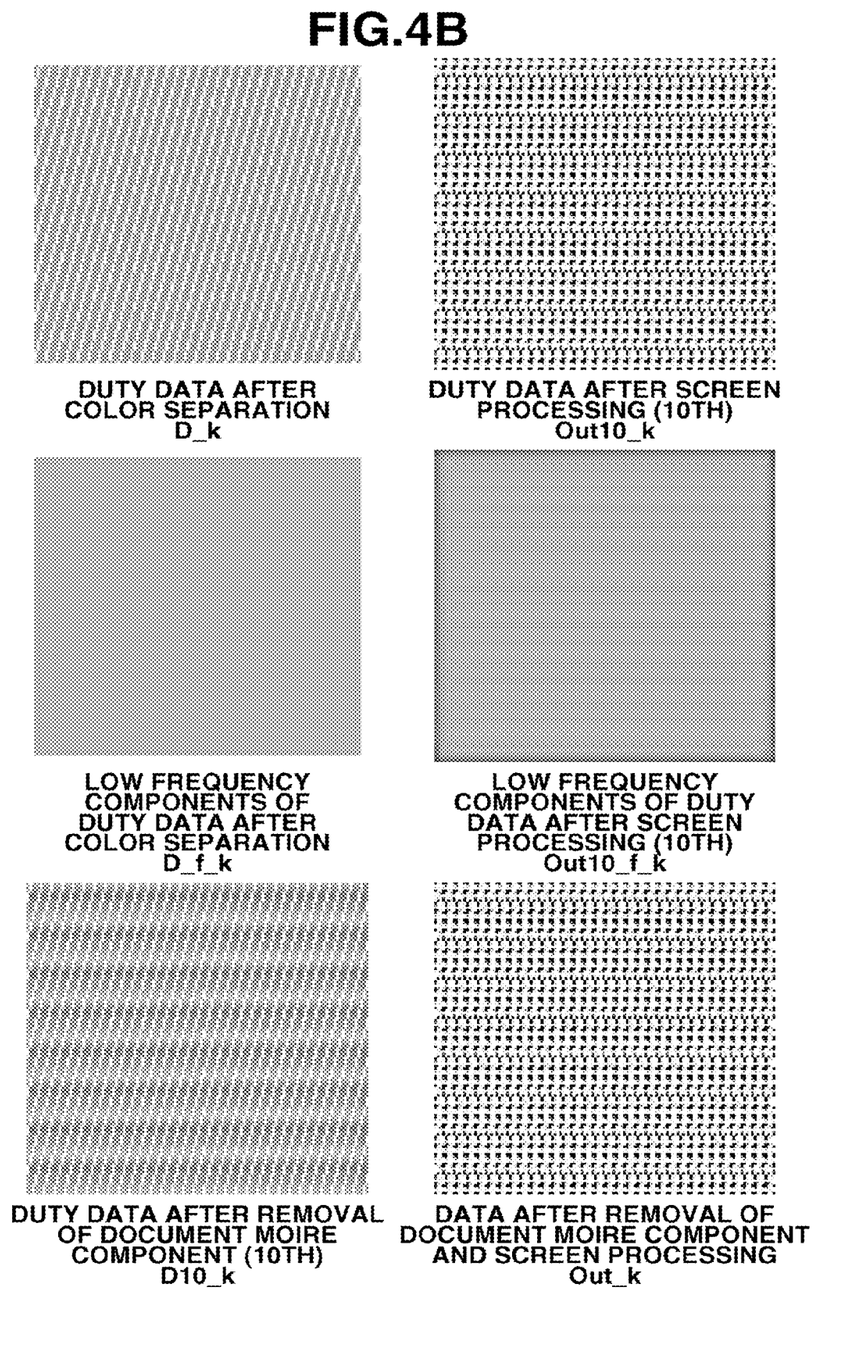
FIG. 4B illustrates each data and effect in the image processing method.

FIGS. 4A and 4B illustrate black planes generated when a document chart in single black of about 5 mm square is processed by the image processing apparatus 101 in the present exemplary embodiment. The number of repetitions of processing in the moire component calculation unit 107 and the moire component removal unit 112 is set to 10. FIG. 4A illustrates images when the repetition is once. FIG. 4B illustrates images when the repetitions are ten times.

The images when the repetition is once in FIG. 4A are described below. The D_k is color-separated duty data output from the color separation processing unit 104. The Out1_k is screen-processed data output from the screen processing unit 108 in the moire component calculation unit 107. The D_f_k is low-frequency components of the color-separated duty data output from the filter processing unit 110. Out1_f_k is a moire component data output from the filter processing unit 109.

Image data D_f_k is acquired by subjecting the duty data D_k to the filter processing and image data Out1_f_k is acquired by subjecting the screen-processed data Out1_k to the filter processing.

D1_k is duty data output from the moire component removal unit 112 after the removal of moire components. This duty data is the second input to the screen processing unit 108 in the moire component calculation unit 107. Out2_k is second screen-processed data output from the screen processing unit 108 in the moire component calculation unit 107.

In FIG. 4A, Out1_k is screen-processed images in which the color-separated duty data D_k is subjected to the screen processing and a horizontal-striped moire which does not exist in the original image is visually recognized in the figure. The second screen-processed data Out2_k is images in which the duty data D1_k after the removal of moire components is subjected to the screen processing and the moire in Out2_k is harder to visually recognize than that in the Out1_k. The reason that the moire in the Out2_k is harder to visually recognize than that in the Out1_k can be intuitively understood by comparing Out2_k with the Out1_k. While the moire is visually recognized in the Out1_k, a pattern in which the gradation of the moire in the Out1_k is reversed is visually recognized in the D1_k. In other words, it is said that in the D1_k, the pattern in which the gradation of the moire is reversed is added to the color-separated duty data D_k. For this reason, the moire is hard to visually recognize in the Out2_k in which the D1_k is subjected to the screen processing.

The moire can be reduced in the Out2_k, however, moire components to be removed remain.

The present embodiment is characterized in that processing for the moire component calculation and the moire component removal is repeated two or more times to completely remove moire components to further suppress the moire, thereby outputting a high quality image.

FIG. 4A illustrates images obtained at the tenth repetition. The D_k and the D_f_k are the same as those in FIG. 4A, so that the description thereof is omitted.

Out10_k is screen-processed data output from the screen processing unit 108 at the tenth repetition. Out10_f_k is low-frequency components of moire output from the filter processing unit 109 at the tenth repetition.

D10_k is duty data after the removal of moire components output from the moire component removal unit 112 at the tenth repetition. Out_k is screen-processed data after the removal of moire components, output from the screen processing unit 119.

In FIG. 4B, Out10_f_k is the moire components newly calculated at the tenth repetition. It is obvious from the comparison between the Out10_f_k and the Out1_f_k that the degree of moire components is reduced. In this case, the final output result is the Out_k. The moire components in the Out_k are more sufficiently reduced than those in the Out1_k and the Out2_k.

Figure 5:
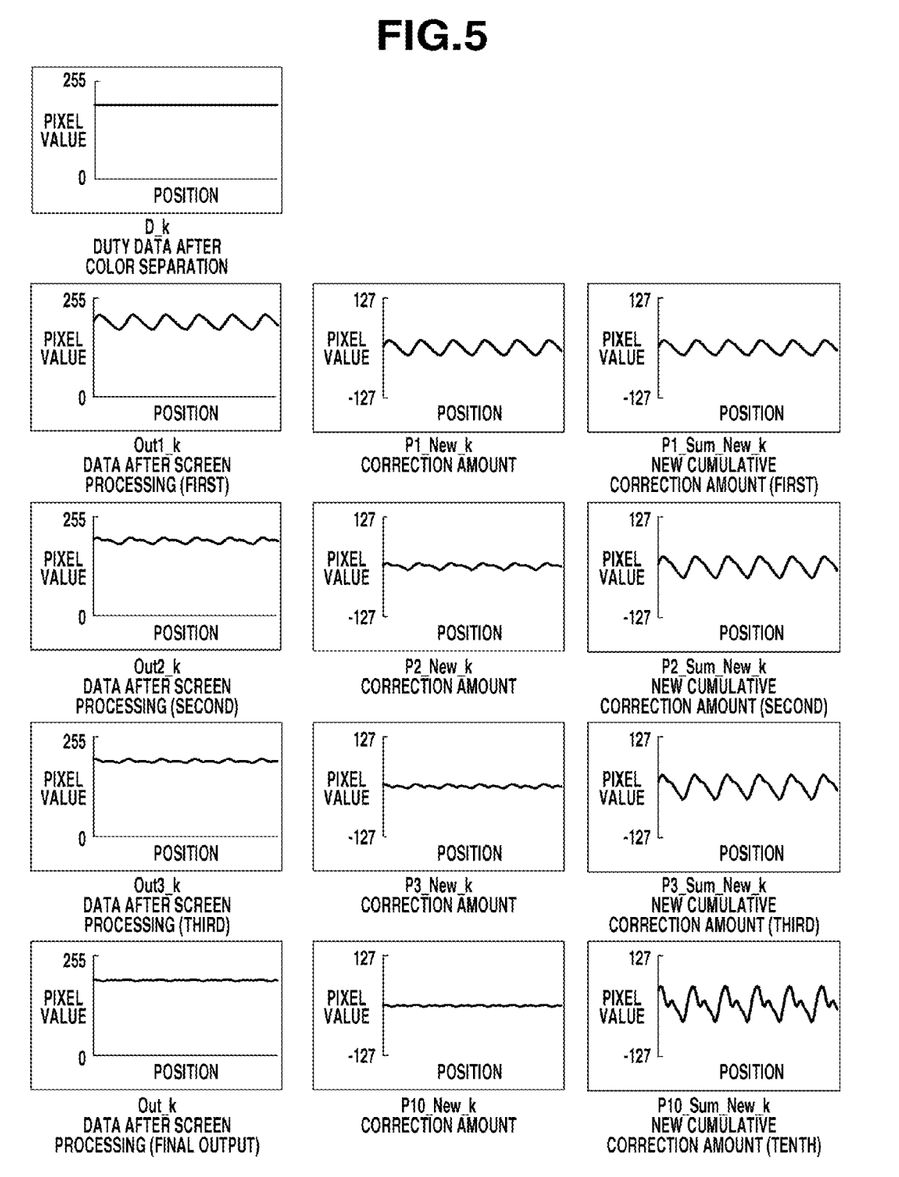
FIG. 5 illustrates the distribution of pixel values of the image data acquired at the steps in the image processing method.

FIG. 5 illustrates the distribution of image data acquired during the processing according to the present exemplary embodiment. The distribution of image data represents the average of the horizontal pixel values and the change of the vertical pixel values in the image data. In FIG. 5, as is the case with FIG. 4, the D_k indicates the color-separated duty data output from the color separation processing unit 104. The Out1_k, Out2_k, and Out3_k, Out_k indicate screen-processed data output from the screen processing unit 108 at the first, the second, the third, and the tenth repetition respectively. The P1_New_k, P2_New_k, P3_New_k, and P10_New_k indicate correction amounts at the first, the second, the third, and the tenth detection respectively. The P1_Sum_New_k, P2_Sum_New_k, P3_Sum_New_k, and P10_Sum_New_k indicate cumulative correction amounts at the first, the second, the third, and the tenth respectively.

P1_New_k is a correction amount calculated based on the moire component occurring at the Out1_k. P1_Sum_New_k is the result in which the correction amount is cumulatively added. In the calculation of the first moire component, a cumulative value before the cumulative addition is carried out, is zero, so that the P1_New_k is equal to the P1_Sum_New_k. Similarly, the result in which the moire component occurring at the Out2_k is calculated is represented by the P2_New_k. P2_Sum_New_k is obtained by cumulatively adding the moire components. The third and the tenth repetition illustrated in the figure are dealt with in a similar manner. It can be seen from FIG. 5 that the calculation and the removal of moire components are repeated to accumulate the moire components. Finally, the data P10_Sum_New_k is removed from the color-separated duty data D_k, so that moire components can be sufficiently reduced as seen in the Out_k.

As described above, according to the present exemplary embodiment, the moire caused by the screen processing can be suppressed without blurring an input image.

OTHER EMBODIMENTS

In the first exemplary embodiment, the screen processing units 108 and 119 are used for the screen processing. However, the present invention is applicable to any screen processing for converting image data to data representing gradation using the AM screen.

A calculation unit configured to calculate the correction amount based on low-frequency components of a difference between the screen-processed image data and the input image data corresponds to the correction amount calculation unit 113. In the first exemplary embodiment, low-frequency components of a difference between the screen-processed image data and the image data before the screen processing are calculated by performing subtraction after their respective data is subjected to the filter processing. However, the value obtained by subtracting the screen-processed image data from the image data before the screen processing may be subjected to the filter processing. More specifically, low-frequency components of a difference between the screen-processed image data and the input image data have only to be the frequency components corresponding to the moire components.

Further, in the filter processing units 109 and 110 for calculating low-frequency components, convolution between the image data before the filter processing and a low-pass filter (LPF) in real space is acquired to generate an image after the filter processing. However, the filter processing can be performed in a frequency space to improve its processing accuracy. For this reason, the processing in the filter processing units 109 and 110 may be performed as represented by an equation (41):

$$I2 = IDFT(DFT(I1) \times DFT(LPF)) \quad (41)$$

where, I1 is an image before the filter processing, I2 is an image after the filter processing, DFT is discrete Fourier transform, and IDFT is inverse discrete Fourier transform.

In the first exemplary embodiment, the cumulative correction amount addition unit 115 and the correction unit 117 are used as an accumulation unit, however, the correction amount does not need to be calculated as the cumulative correction amount. After the correction amount is calculated, the correction amount may sequentially be added to the image data processed by the screen processing unit 108.

Figure 6:
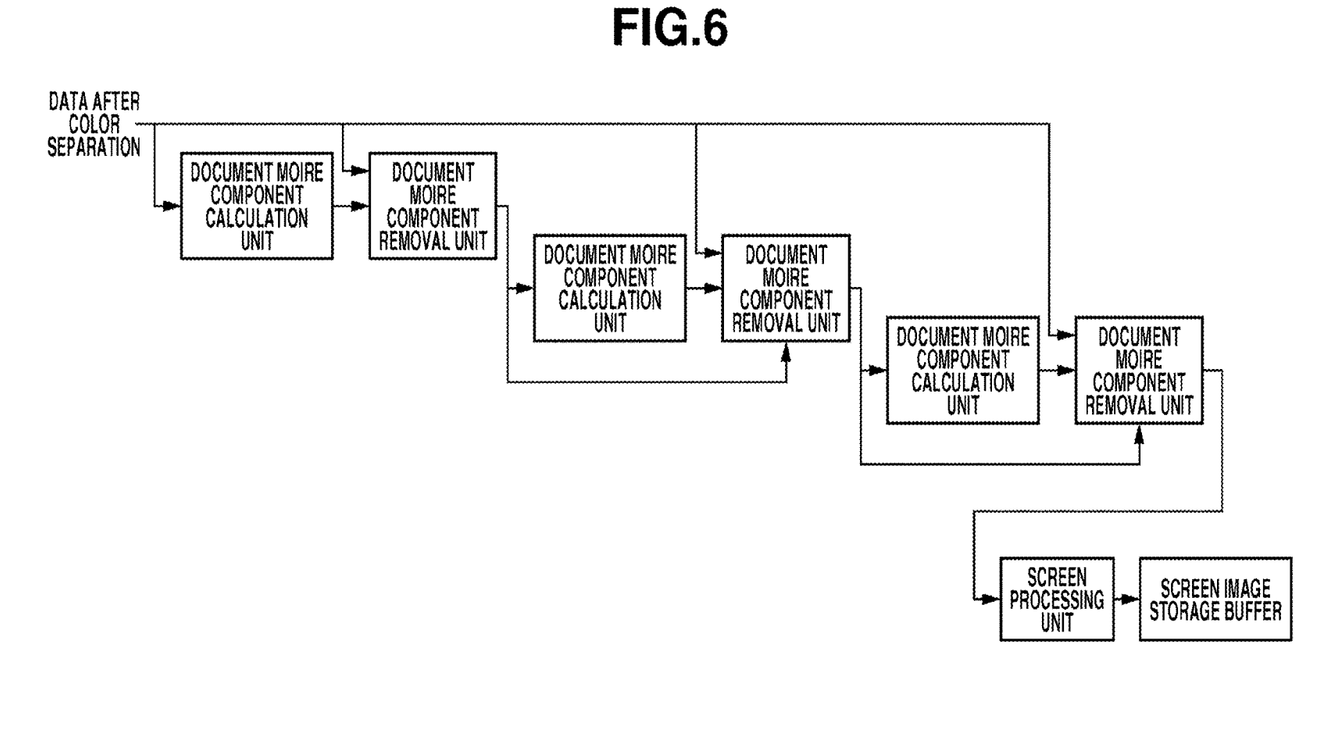
FIG. 6 illustrates an example of a configuration of another exemplary embodiment.

In the first exemplary embodiment, while the repetition determination unit 118 is used to perform a repetitive process, the repetition determination unit 118 is not necessarily required. FIG. 6 illustrates an example which does not use the repetition determination unit 118. In this example, two or more moire component calculation units and moire component removal units are provided in order. The number of repetitions in the example is three. The moire component calculation unit and moire component removal unit are arranged in sequence. The correction amount is sequentially added to the cumulative correction amount stored in the cumulative correction amount storage unit of the preceding moire component removal unit. Such a configuration allows a pipeline-like and a high-speed processing.

In a case of configuring a repetition determination unit, the present invention is not limited to the determination method using the repetition determination unit 118 according to the above exemplary embodiments. The repetition determination unit 118 according to the first exemplary embodiment performs determination based on the number of repetitions of the moire component calculation unit 107 and the moire component removal unit 112. Further, as another determination method, repetition is ended when change in a cumulative correction amount is equal to or less than a predetermined value.

In the present exemplary embodiment, the processing is repeated by the predetermined number of times after the moire component calculation unit 107 and the moire component removal unit 112 process all pixels. However, the repetition determination does not need to be performed after the moire component calculation unit 107 and the moire component removal unit 112 process all pixels. For example, the repetition determination is performed for each block to repeat the processing by the moire component calculation unit and the moire component removal unit. As described above, the present invention is not limited to the above exemplary embodiments as long as the correction processing for removing moire components caused by the screen processing is repeated.

The above exemplary embodiments describe the image processing method for suppressing moire in the electrophotographic method. However, the present invention is also applicable to a recording device (for example, inkjet type, thermal transfer type, and offset printing type) which performs printing by methods other than the electrophotographic method.

The present invention can be embodied as a system, apparatus, method, program or storage medium (recording medium) as an exemplary embodiment. The present invention may be applied to a system comprised of a plurality of devices (for example, a host computer, interface device, imaging apparatus, and web application) or a system comprised of a single device. In an example, a computer-readable medium may store a program that causes an image processing apparatus to perform a method described herein. In another example, a central processing unit (CPU) coupled to a memory may be configured to control at least one unit utilized in a method or apparatus described herein.

According to the present invention a software program for realizing the functions of the above exemplary embodiments can be supplied to a system or apparatus and the computer executes the supplied program. In this case, all or a part of configurations forming the present invention may be implemented using software.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-258605 filed Nov. 19, 2010, which is hereby incorporated by reference herein in its entirety.

What is claimed is:

1. An image processing apparatus for performing screen processing on input image data via passes, the image processing apparatus comprising:
    a screen processing unit configured to receive the input image data or corrected image data as received image data and perform screen processing on the received image data to produce screen-processed image data;
    a detection unit configured to detect a difference between low frequency components of the input image data and low frequency components of the screen-processed image data; and
    a correction unit configured to correct pixel values in the input image data based on a difference detected by the detection unit to produce corrected image data,
    wherein at least one of the screen processing of the screen processing unit, the difference detection of the detection unit, and the input image data correction of the correction unit is repeated on a subsequent pass to convert the input image data to screen-processed image.

2. The image processing apparatus according to claim 1, wherein, to correct pixel values in the input image data based on a difference, the correction unit calculates a correction amount based on the difference and produce corrected image data by correcting the input image data using a value that is a sum of the calculated correction amount and an accumulation of calculated correction amounts.

3. The image processing apparatus according to claim 2, wherein, in response determining that a process by the screen processing unit, the detection unit, and the correction unit has not been sufficiently repeated according to a predetermined threshold, the correction unit corrects the input image data by the value and the corrected image data is input into the screen processing unit.

4. The image processing apparatus according to claim 1, wherein, in response to determining that the process by the screen processing unit, the detection unit, and the correction unit has not been sufficiently repeated according to a predetermined threshold, the correction unit corrects the input image data and the corrected image data is input into the screen processing unit.

5. The image processing apparatus according to claim 1, further comprising a determination unit configured to determine whether a process by the screen processing unit, the detection unit, and the correction unit is to be repeated.

6. The image processing apparatus according to claim 5, wherein the determination unit makes the determination depending on whether a determined number of repetitions reaches a predetermined number of times as a predetermined threshold.

7. The image processing apparatus according to claim 5, wherein, to correct pixel values in the input image data based on a difference, the correction unit calculates a correction amount based on the difference and calculates a value that is a sum of the calculated correction amount and an accumulation of calculated correction amounts, and
    wherein the determination unit makes the determination depending on whether a change in the accumulation of calculated correction amounts is equal to or less than a predetermined value as a predetermined threshold.

8. The image processing apparatus according to claim 1, wherein, to correct pixel values in the input image data based on a difference the correction unit includes a calculation unit configured to calculate a correction amount by multiplying the low frequency components of the input image data and the low frequency components of the screen-processed image data by a correction coefficient such that the calculated correction amount is converged according to a predetermined threshold.

9. The image processing apparatus according to claim 1, wherein the detection unit includes a subtraction unit, a first filter processing unit configured to subject the input image data to filter processing, and a second filter processing unit configured to subject the screen-processed image data to filter processing, and wherein the subtraction unit detects the low frequency components by subtracting a result of processing by the first filter processing unit from a result of processing by the second filter processing unit.

10. The image processing apparatus according to claim 1, wherein the detection unit subjects a result, obtained by subtracting the input image data from the screen-processed image data, to filter processing to detect the low frequency components.

11. The image processing apparatus according to claim 1, wherein the image processing apparatus includes a plurality of screen processing units, detection units, and correction units that are arranged in sequence.

12. An image processing method for performing screen processing on input image data via passes, the image processing method comprising:
    receiving the input image data or corrected image data as received image data and perform screen processing on the received image data to produce screen-processed image data;
    detecting a difference between low frequency components of the input image data and low frequency components of the screen-processed image data; and correcting pixel values in the input image data based on a detected difference to produce corrected image data, wherein at least one of the screen processing, the difference detection, and the input image data correction is repeated on a subsequent pass to convert the input image data to screen-processed image.

13. A non-transitory computer-readable medium storing a program to cause an image processing apparatus to perform an image processing method, the image processing method comprising:

receiving the input image data or corrected image data as received image data and perform screen processing on the received image data to produce screen-processed image data;

detecting a difference between low frequency components of the input image data and low frequency components of the screen-processed image data; and correcting pixel values in the input image data based on a detected difference to produce corrected image data, wherein at least one of the screen processing, the difference detection, and the input image data correction is repeated on a subsequent pass to convert the input image data to screen-processed image.

14. The image processing apparatus according to claim 9, wherein the first filter processing unit uses a cutoff frequency that is approximately the same as a cutoff frequency of the second filter processing unit.

15. The image processing apparatus according to claim 1, wherein the screen processing unit is a duty data screen processing unit, the image processing apparatus further comprising a values screen processing unit configured to receive the corrected image data and convert the corrected image data into the screen-processed image as data representing gradation by an amplitude modulation (AM) screen.

16. The image processing apparatus according to claim 15, wherein the image processing apparatus is one of an offset printing device or an electrophotographic recording apparatus.

* * * * *